United States Patent Office 3,759,853
Patented Sept. 18, 1973

3,759,853
OIL-MODIFIED ALKYD COMPOSITIONS
Robert L. Formaini, Montvale, N.J., and Young D. Kim, Severn, Md., assignors to Allied Chemical Corporation, New York, N.Y.
No Drawing. Continuation of application Ser. No. 760,661, Sept. 18, 1968, which is a continuation-in-part of application Ser. No. 454,991, May 11, 1965, both now abandoned. This application June 26, 1969, Ser. No. 836,933
Int. Cl. C09d 3/52, 3/66
U.S. Cl. 260—21        3 Claims

ABSTRACT OF THE DISCLOSURE

An alkyd composition produced by reacting a polycarboxylic acid, a polyhydric alcohol, a tris - 2 - hydroxyalkyl isocyanurate wherein the 2-hydroxyalkyl group contains between two and four carbon atoms, with an oily modifier selected from the group consisting of vegetable oils, marine oils, and fatty acids derived from vegetable oils, marine oils, and fatty acids derived from vegetable oils or marine oils. The resulting reaction product is then blended with an amino resin.

CROSS REFERENCE TO RELATED APPLICATIONS

This application is a continuation of Ser. No. 760,661, filed Sept. 18, 1968, now abandoned, which is a continuation-in-part of Ser. No. 454,991, filed May 11, 1965, now abandoned.

This invention relates to alkyd resin-based composition with improvements in surface qualities such as hardness, gloss, as well as improvements in curing rate, and the like.

Alkyd resins are polycondensation products of the reaction between polybasic acids and polyhydric alcohols. Alkyd resins are broadly classifiable as oil-modified and oil-free resins. The oil-modified variety, depending on the properties of the various formulations desired, can contain more or less oil fused with the alkyd resin simultaneously with the esterification. As the oil content increases, the art distinguishes between short-, medium-, long-, and very long-oil alkyds, wherein the length of the oil content changes in direct proportion from about 30% by weight of fatty acid in the short oil variety up to 70% or more in the very long-oil resin. Oil modified alkyds cure by one of two principal mechanisms depending mainly on the nature of the modifying oil or fatty acid derivative of the oil. Non-oxidizing alkyds utilize saturated, non-drying modifiers and a urea-formaldehyde or like additive is used to accomplish crosslinking. The oxidinzing alkyds contain a drying oil modifier, and can be cured either by mere solvent evaporation and oxygen-induced crosslinking, or, such resins can be further modified with amino resins such as acid catalyzed urea resins. In the oil-modified or oil-free alkyds blended with amino resins, the amino resin polymerizes and crosslinking occurs between the hydroxyl group of the alkyd and the functional groups of the amino resin. Any reference made hereinafter to "modified" alkyds is intended to include oil modified alkyds with or without an amino resin, as well as oil free alkyds modified with an amino resin.

A large variety of modified alkyd resin formulations have been developed with a large variety of properties to make them suitable for all types of applications such as coating compositions, plasticizers, and the like. One important composition variable is the concentration and the nature of the oil or fatty acid in oil-modified alkyds. In many formulations the polyol and/or the polybasic acid, used to prepare the alkyd resin, is varied. In most formulations a mixture of polybasic acids is used. The important properties of alkyds include solubility, visvosity, curing time, drying rate, hardness, brushing ease, flow, sagging, grinding ease, initial gloss, gloss retention, color retention, surface durability, water impermeability, can stability, adhesion and flexibility. In developing of alkyd formulations, when the adjustment of one or more of the properties of the alkyd is desired, the improvement of one property very often results in a deterioration of another. Difficulties of this type have led to a number of alkyd formulations containing a large, and often unwieldy number of ingredients.

It is an object of the present invention to provide an improvement in modified alkyd formulations so as to give to coatings prepared therewith greater hardness, increased gloss, and a faster rate of cure.

Modified alkyd compositions of the present invention contain an effective amount of a tris-2-hydroxyalkyl isocyanurate of the following formula:

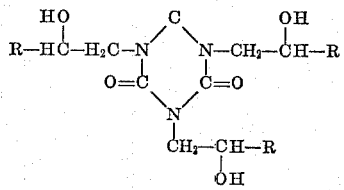

wherein R is hydrogen or an alkyl radical, preferably hydrogen or an alkyl radical of up to 2 carbon atoms. In accordance with the process of the present invention improved alkyd formulations of the invention are produced by substituting amounts equivalent on the basis of hydroxyl functions of a tris-2-hydroxyalkyl isocyanurate for between 5 and 50 mol percent of a tribasic alcohol, or an equivalent amount of the polyol used in the preparation of the alkyd polyester. The invention is particularly useful in the preparation of baking enamels which generally have more stringent surface quality requirement than other coating compositions.

Tris - 2 - hydroxyalkyl isocyanurates, for use in accordance with the present invention, and the preparation thereof, are described in greater detail in U.S. Pat. No. 3,088,948 issued to Allied Chemical Corporation.

The polyhydric alcohol most frequently used in the preparation of alkyds is glycerol; however, other polyols such as pentaerythritol, polypentaerythritols, mannitol, sorbitol, trimethylolethane, trimethylolpropane, and a number of lower alkylene glycols, or mixtures thereof, can also be used. In the case when glycerol, a tribasic alcohol is substituted with the tris-2-hydroxyalkyl compound, the substitution is on a mol for mol basis. When other polyfunctional alcohols are being substituted, the substitution is on the basis of hydroxyl function equivalency.

Of the polybasic acids or their anhydrides, phthalic anhydride is most commonly used; however, maleic, fumaric, succinic, adipic, azelaic, sebacic, mellitic, trimellitic, isophthalic, and terephthalic acids, their anhydrides, or various combinations thereof are also used. It is to be understood that by referring hereinafter to "polybasic acids," anhydrides are also meant to be included in that term.

Representative fatty oils which may be used for this purpose are included the non-drying, semi-drying, and drying fatty oils, including vegetable oils and animal oils, marine oils and treated marine oils, such as soya, cottonseed, hydrogenated cottonseed, linseed, castor, hydrogenated castor, dehydrated castor, coconut, tung, oiticica, menhaden, hempseed, grapeseed, corn, cod-liver, candlenut, walnut, perilla, poppyseed, safflower, conjugated safflower, sunflower, rapeseed, China-wood, tristearin, whale, sardine, herring, etc. oils. Instead of using these oils, it should be understood that for the purposes of the present invention fatty acids or mixtures of fatty acids which make up the fatty oils or their equivalents can be employed.

Representative monocarboxylic acids including fatty acids may be illustrated by the following: caproic acid, caprylic acid, castor fatty acid, coconut fatty acid, cottonseed fatty acid, crotonic acid, DCO FA, i.e. primarily

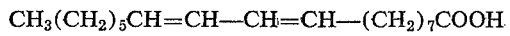

lauric acid, linoleic acid, linolenic acid, linseed FA, oleic acid, pelargonic acid, rosin acid (A.N. 165), soya FA, tall oil FA (A.N. 195, A.N. 192), etc.

The alkyd coating composition of the invention can be provided as a solution in aliphatic or aromatic solvents in known manner. Better known solvents for alkyds are xylene, toluene, mineral spirits, naphtha, chlorinated hydrocarbons, ketones, esters, glycol ethers, or water, depending on the purpose of use and the solubility of the particular composition.

Further modifying agents for oil-modified or non-oil alkyds include amino resins such as melamine-formaldehyde resins or derivatives thereof, rosin, phenolic resins, styrene, vinyl toluene, silicones, and the like.

As is known in the art of oil-modified alkyds, when the particular oil-modifier is a fatty acid, direct esterification is possible; i.e. the fatty acid modifier participates in the polycondensation between the polyol and the polybasic acid. When the oil modifier is a vegetable or marine oil, i.e. a triglyceride, an alcoholysis or ester interchange reaction between the oil and the polyol is necessary to provide functional groups, by reducing the triglyceride to a lower glyceride, prior to esterification. The alcoholysis, or transesterification is conducted in the presence of a polyol and a suitable catalyst such as calcium naphthenate, calcium hydroxide, litharge, or the like, to form a monoglyceride. In the subsequent polycondensation reaction between the polyol and polybasic acid, the monoglyceride will also participate in reacting with the polybasic acid and additional polyol to form the oil-modified alkyd resin.

In accordance with the invention the amount of tris-2-hydroxyalkyl isocyanurate effective for improving alkyds is unlimited; however, it was found that an isocyanurate substitution for less than 5 mol percent of the polyol, based on a tribasic alcohol, does not result in a marked improvement, while an isocyanurate substitution of over about 50 mol percent of the polyol, based on a tribasic alcohol, would render the resulting resin too viscous.

The following examples set forth the best way contemplated for carrying out the present invention. Parts and percentages are by weight and temperature in degrees centigrade, unless otherwise specified. The various physical properties and the tests for their determination are well known in the art and are described in greater detail in a book by H. A. Gardner, and G. G. Sward; entitled Physical and Chemical Examination of Paints, Varnishes, Lacquers and Colors; H. A. Gardner Laboratory, Bethesda, Md.; and in another book by H. F. Payne; entitled Organic Coating Technology, John Wiley and Sons, Inc., New York. The measure of "Sward hardness" includes a measure of curing rate, since it is measured within a given time after the coating has been applied.

EXAMPLE 1

427 parts coconut oil and 138 parts glycerol were introduced into a reaction kettle equipped with a stirrer, thermometer, and inert gas inlet tube. The charge was heated and agitated with nitrogen bubbled through. When the temperature reached 180°, 2 parts of a 5% calcium naphthenate solution was added as an alcoholysis catalyst. The temperature was increased to 235° and the alcoholysis was continued until the monoglyceride had at least 3:1 compatability with methanol. This took about 1.5 hours at a temperature between 225° and 235°. After the alcoholysis, the alkyd was prepared by cooling the kettle to 180°, at which temperature 547 parts phthalic anhydride, 20 parts maleic anhydride, and 130 parts glycerol were added, during which period the temperature dropped to between 120° and 130°. After the components were added, the temperature was raised to 170°–175° and 209 parts tris-2-hydroxyethyl isocyanurate was added. The temperature was then further raised to 225°–235° and the esterification was continued until the acid number, solids basis, approached 8–12, and the Gardner viscosity at 60% solids content in xylene was between Z2–Z4. The desired end point was reached in 4 hours. The kettle was cooled to 180° and the resin was diluted to about 55.8 solids content with xylene. The resin had an acid number solid basis of 6.02, and a Gardner viscosity of Z4–Z5.

Butylated melamine-formaldehyde resin is made in a known manner by heating 632 parts paraformaldehyde containing 95% $CH_2O$, and 3200 parts n-butanol under reflux until the paraformaldehyde dissolves. 24 parts glacial acetic acid and 504 parts melamine are added, and the suspension is heated until it is clear, and then the clear solution is refluxed for 45 minutes. After the 45 minutes 30 parts 98% triethanolamine is added to terminate the reaction and the solution is cooled. Water and n-butanol are stripped from the solution at less than 50 mm. Hg pressure and at about 50–70°. Subsequently xylene is added to thin the resin, and the solution is filtered.

18 parts by weight butylated melamine-formaldehyde resin in 28 parts by weight xylene, prepared as just described, was blended with 45 parts by weight of the alkyd the preparation of which was described at the outset of this example. The resulting mixture was sprayed onto commercial phosphated steel panels and cured at 95° for 25 minutes. Test results of the cured baking enamel were as follows:

| | |
|---|---|
| Sward hardness _____ in. lb__ | 40 |
| Impact resistance (front) _____ in. lb__ | 36 |
| Mandrel wrap (bend) _____ in. dia__ | ⅛ |
| Gloss _____ | 100 |

The above example was repeated without adding tris-2-hydroxyethyl isocyanurate, using a total of one mol glycerol for each mol phthalic anhydride. The properties of the resulting baked enamel were as follows:

| | |
|---|---|
| Sward hardness _____ | 28 |
| Impact resistance (front) _____ in. lb__ | 36 |
| Impact resistance (back) _____ in. lb__ | 36 |
| Mandrel wrap (bend) _____ | ¼ |
| Gloss _____ | 88 |

EXAMPLE 2

The process of Example 1 was repeated, but by making at this time a tris-2-hydroxyethyl isocyanurate substitution for 8.1 mol percent of the glycerol instead of the 21.6 mol percent substitution of Example 1, 125 parts glycerol, and 78 parts tris-2-hydroxyethyl isocyanurate were used. The completed resin was diluted to 60.15% solids. The resin had an acid number, solids basis, of 6.7 and a Gardner viscosity of Z4.

The properties of the baked enamel were as follows:

| | |
|---|---|
| Sward hardness _____ | 30 |
| Impact resistance (front) _____ in. lb__ | 36 |
| Impact resistance (back) _____ in. lb__ | 36 |
| Mandrel wrap (bend) _____ in. lb__ | ⅛ |
| Gloss _____ | 100 |

EXAMPLE 3

435 parts neopentyl glycol and 99 parts tris-2-hydroxyethyl isocyanurate were charged into a reaction kettle equipped with stirrer, thermometer, inert gas inlet tube, and steam heated reflux condenser topped with a water-cooled condenser. After the mixture was melted at 145–155°, 324 parts trimellitic anhydride, 165 parts adipic acid, and 0.5 parts calcium naphthenate were added. The temperature of the mixture was maintained between 170° and 177°. Heating was continued for 16–17 hours until an acid number of 67.8. The mixture was then cooled, diluted with water to 60% solids content, and neutralized with dimethylethanolamine to a pH of 7.2. The syrup was then filtered clean.

59 parts of the 60% solids content alkyd thus prepared was blended with 9 parts (100% solids) hexa(methoxymethyl) melamine and 3 parts water-soluble melamine acrylic resin as surface stabilizer. The mixture was spread onto steel panels and cured at 150° for 20–30 minutes. The test results obtained are given in the following. The parenthetical numbers following the test results indicate the results of a control test on an alkyd prepared in accordance with the alkyd of the present example but omitting the tris-2-hydroxyethyl isocyanurate. Where no parenthetical numbers are given, the results are the same.

| | |
|---|---|
| Sward hardness | 74 (40) |
| Impact resistance (front) in. lb | >36 |
| Impact resistance (back) in. lb | >36 |
| Mandrel wrap (bend) in. dia | 1/8 |
| Gloss | >100 (<90) |

EXAMPLE 4

The process of Example 3 was repeated, using 106 parts propylene glycol and 156 parts neopentyl glycol as the polyols; with 110 parts adipic acid and 216 parts trimellitic anhydride as the acid components; and 66 parts tris-2-hydroxyethyl isocyanurate. The resin was cooked to an acid number of 56 and neutralized to a pH of 8, and blended as in Example 3. The following test results were obtained:

| | |
|---|---|
| Sward hardness | 70 |
| Impact resistance (front) in. lbs | >36 |
| Impact resistance (back) in. lbs | >36 |
| Mandrel wrap in. dia | 1/8 |
| Gloss | <90 |

What is claimed is:
1. An oil-modified alkyd composition comprising:
    (1) the reaction product of
        (a) glycerol
        (b) phthalic anhydride
        (c) maleic anhydride
        (d) coconut oil, and
        (e) tris-2-hydroxyethyl isocyanurate, and
    (2) butylated melamine-formaldehyde resin blended with said reaction product.
2. An oil-modified alkyd composition comprising:
    (1) the reaction product of
        (a) glycerol
        (b) phthalic anhydride
        (c) maleic anhydride
        (d) coconut oil, and
        (e) tris-2-hydroxyethyl isocyanurate, and
    (2) hexa(methoxymethyl)melamine blended with said reaction product.
3. An oil-modified alkyd composition comprising:
    (1) the reaction product of
        (a) pentaerythritol
        (b) phthalic anhydride
        (c) soya oil, and
        (d) tris-2-hydroxyethyl isocyanurate, and
    (2) butylated melamine-formaldehyde resin blended with said reaction product.

References Cited
UNITED STATES PATENTS

| | | | |
|---|---|---|---|
| 3,025,251 | 3/1962 | Layman | 260—21 |
| 3,133,032 | 5/1964 | Jen et al. | 260—22 |
| 3,211,585 | 10/1965 | Meyer et al. | 260—248 |
| 3,211,806 | 10/1965 | Petropoulos et al. | 260—67.6 |
| 3,297,785 | 1/1967 | George et al. | 260—22 |
| 3,312,645 | 4/1967 | George et al. | 260—22 |

MAURICE J. WELSH, Primary Examiner

R. W. GRIFFIN, Assistant Examiner

U.S. Cl. X.R.

117—132 B, 161 K; 260—22 C Q